US007161477B2

(12) United States Patent
Ohtomo et al.

(10) Patent No.: US 7,161,477 B2
(45) Date of Patent: Jan. 9, 2007

(54) SEAT BELT ALARM APPARATUS

(75) Inventors: Yosuke Ohtomo, Tokyo (JP); Tatsuya Michishige, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/879,699

(22) Filed: Jun. 28, 2004

(65) Prior Publication Data
US 2005/0012605 A1 Jan. 20, 2005

(30) Foreign Application Priority Data
Jul. 3, 2003 (JP) .............................. 2003-191378

(51) Int. Cl.
*B60Q 1/00* (2006.01)
*B60R 22/00* (2006.01)
*E05F 15/00* (2006.01)
*G05D 1/00* (2006.01)
*G06F 7/00* (2006.01)

(52) U.S. Cl. ...................... 340/457.1; 701/45
(58) Field of Classification Search ............ 340/457.1, 340/457, 459; 701/45, 36, 29
See application file for complete search history.

(56) References Cited
U.S. PATENT DOCUMENTS
5,923,256 A * 7/1999 Satake et al. ................ 340/575

6,278,358 B1 * 8/2001 Spoto et al. ............. 340/425.5
6,362,734 B1 * 3/2002 McQuade et al. ........ 340/457.1
6,501,374 B1 * 12/2002 King et al. .............. 340/457.1
7,023,335 B1 * 4/2006 Okita et al. ............. 340/457.1
2004/0124974 A1 * 7/2004 Ota et al. ................ 340/457.1
2004/0178902 A1 * 9/2004 Koike et al. ............. 340/457.1

FOREIGN PATENT DOCUMENTS
JP 167780 * 6/1998
JP 11-342831 A1 12/1999

* cited by examiner

Primary Examiner—Daniel Wu
Assistant Examiner—Jennifer Mehmood
(74) Attorney, Agent, or Firm—Darby & Darby

(57) ABSTRACT

A seat belt alarm apparatus according to the present invention executes a weak alarm pattern in which an alarm lamp is blinked and lighted repeatedly when a seat belt switch is turned on and a seat belt is unfastened, and a vehicle speed is equal to or less than a buzzer sound start vehicle speed. When the vehicle speed is more than the buzzer sound start vehicle speed, the seat belt alarm apparatus executes a strong alarm pattern in which the alarm lamp is blinked and lighted repeatedly as well as a buzzer is sounded in synchronism with the blinking of the alarm lamp, and the alarm operation is continued until the seat belt switch is turned off and the seat belt is fastened.

6 Claims, 6 Drawing Sheets

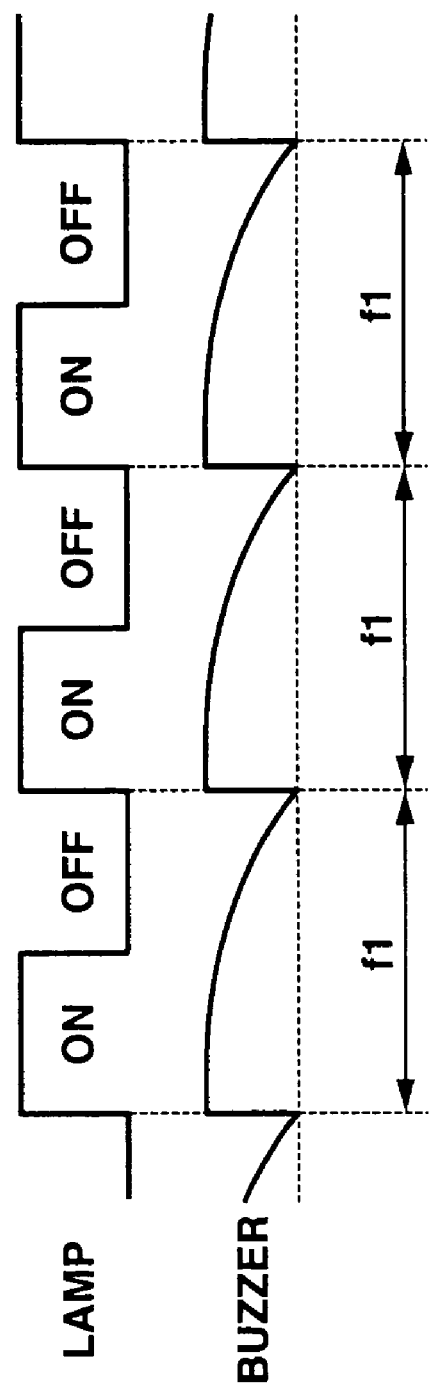

SEAT BELT ALARM APPARATUS

The disclosure of Japanese Patent Application No. 2003-191378 filed on Jul. 3, 2003, including the specification, drawings and abstract is incorporated herein in its entirety for reference.

BACKGROUND OF THE INVENTION

1. Field of the Invention

The present invention relates to a seat belt alarm apparatus for prompting to fasten a seat belt, particularly to a warning system for a passenger about an unbuckling condition of the seat belt without giving the passenger an uncomfortable feeling.

2. Description Related Art Statement

Heretofore, in this type of seat belt alarm apparatuses, occupants including a driver are prompted to fasten seat belts by driving a buzzer and an alarm lamp when an ignition switch is turned on and a seat belt is unfastened.

For example, Japanese Unexamined Patent Application Publication No. 11-342831 discloses a technology for prompting the occupants to fasten the seat belts when the seat belt is unfastened while a vehicle travels by lighting the alarm lamp as well as interrupting a power supply to an audio device and an air conditioner.

In the technology disclosed in Japanese Unexamined Patent Application Publication No. 11-342831, however, when the vehicle starts in a state that the seat belt is unfastened, since the audio device and the air conditioner are instantly stopped, the driver, who does not sufficiently recognizes that a seat belt alarm is issued, is liable to make misunderstanding that these are stopped by malfunction, which gives incomprehensible or uncomfortable feeling to the driver.

Further, comfortable environment presenting means such as the audio device, the air conditioner, and the like is arbitrarily manipulated by the occupants, when all of these are turned off from the beginning, an environment in the vehicle when the vehicle stops is not changed from an environment when the vehicle starts. Accordingly, it is impossible to raise awareness of the occupants for fastening the seat belt. Further, even if the comfortable environment presenting means are turned on while the vehicle travels, the occupants make misunderstanding that a failure occurs in them, which gives incomprehensible feeling to the occupants since these do not operate when the seat belt is unfastened.

SUMMARY OF THE INVENTION

Accordingly, an object of the present invention is to provide a seat belt alarm apparatus that can appropriately notify occupants including a driver fastened by the seat belt are not fastened and to raise an awareness of that for fastening the seat belt.

The seat belt alarm apparatus according to the present invention is characterized by including seat belt detection means for detecting whether or not the seat belt is fastened, the alarm means for prompting the occupants to fasten the seat belts, alarm drive means for driving the alarm means, and alarm control means for outputting a drive signal to the alarm drive means, wherein the alarm control means drives the alarm means while the seat belt detection means detects that the seat belt is unfastened after an ignition switch is turned on.

The above and other objects, features and advantages of the present invention will become more clearly understood from the following description by referring to the accompanying drawings.

BRIEF DESCRIPTION OF THE DRAWINGS

FIGS. 6A–6B are waveform views showing a timing at which an alarm lamp and a buzzer are driven.

DETAILED DESCRIPTION OF THE PREFERRED EMBODIMENTS

Figure 1:
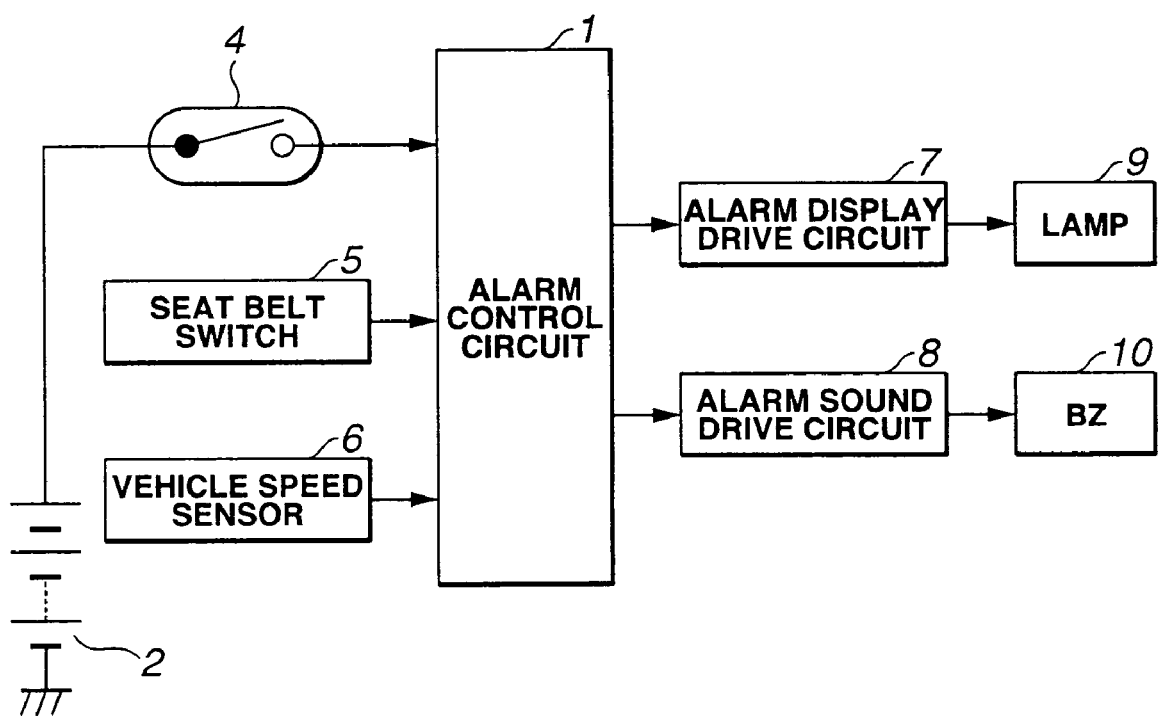
FIG. 1 is a circuit diagram showing an arrangement of a seat belt alarm apparatus.

In FIG. 1, a reference numeral 1 denotes an alarm control circuit as alarm control means, and the alarm control circuit 1 is composed of a microcomputer. A battery 2 is connected to an input side of the alarm control circuit 1 through an ignition switch 4. When the ignition switch 4 is turned on, a control power is supplied from the battery 2 to the alarm control circuit 1, and the alarm control circuit 1 is actuated thereby.

Further, a seat belt switch 5 as seat belt detection means, which detects whether or not a seat belt is fastened, and a vehicle speed sensor 6, which detects a vehicle speed S, are connected to the input side of the alarm control circuit 1. A buckle switch is widely known as the seat belt switch 5. The buckle switch is a normally-closed switch and installed to a buckle disposed in an inner seat belt secured to a seat side. The buckle switch is turned off when it is detected that a tongue disposed to an outer seat belt, which extends from an upper portion of a compartment, is attached to the buckle. Note that the seat belt switch 5 may be arranged as a non-contact system using a photo switch and the like, in addition to a contact system using a micro switch and the like.

In contrast, an output side of the alarm control circuit 1 is connected to an alarm display drive circuit 7 and an alarm sound drive circuit 8 as an alarm drive means, respectively. Further, the respective circuits 7 and 8 are connected to two types of alarm means. The alarm means connected to the alarm display drive circuit 7 is an alarm lamp 9 as alarm display means, and the alarm means connected to the alarm sound drive circuit 8 is a buzzer 10 as alarm sound generation means. Note that the buzzer 10 may be a chime or a speaker, and an alarm sound may be a voice and the like.

The alarm display drive circuit 7 outputs an ON/OFF signal to the alarm lamp 9 at a period f1 in response to a signal from the alarm control circuit 1 to thereby blink the alarm lamp 9 (blinking mode) as shown in FIG. 6A or outputs an ON signal thereto continuously for a predetermined time to thereby light the alarm lamp 9 (lighting mode). The period f1 of blinking in the blinking mode is set to, for example, 1 second. Further, a time during which the alarm lamp 9 is lighted at the time in the lighting mode is set to the time during which the driver can properly recognize a matter about which he or she is alarmed. When the lighting time is too long, there is a possibility that the recognition of the driver about the matter by which he or she is alarmed is made indefinite. In contrast, when the lighting time is too short, a complicated image is given to the driver. Accordingly, in this embodiment, about 15 seconds are set as a lighting time for causing the driver to properly recognize the alarm.

The alarm sound drive circuit 8 drives the buzzer 10 in response to a drive signal from the drive circuit 7, and the pulse drives the buzzer 10 by driving a switching circuit (not shown) in synchronism with the blinking (ON/OFF) period f1 of the alarm lamp 9 so that the buzzer 10 continuously outputs a damping sound, for example, "pong, pong, . . ." as shown in FIG. 6B.

Further, as shown in FIGS. 7A–7E, the lighting and blinking operations of the alarm lamp 9 executed by the alarm display drive circuit 7 is synchronized with the sounding operation of the buzzer 10 executed by the alarm sound drive circuit 8, and the following five types (a)–(e) of patterns (alarm patterns) are set to the operations.

The alarm patterns controlled by the alarm control circuit 1 will be explained based on FIGS. 7A–7E. Note that, in the embodiment, the buzzer 10 is set such that it is inevitably turned off when the alarm lamp 9 is in the lighting mode.

(a) Alarm pattern 1:

The buzzer 10 outputs a damping sound continuously during a set time t1 (for example, 6 seconds) as well as the alarm lamp 9 is blinked at a period (f1) that corresponds to the damping sound output once. Since the operation of the alarm lamp 9 is synchronized with that of the buzzer 10, a relation between the alarm and fastening of the seat belt can be easily recognized. Further, the alarm can be visually recognized by blinking the alarm lamp 9.

(b) Alarm pattern 2:

The buzzer 10 is turned off during the set time t2 (for example, 6 seconds) as well as the alarm lamp 9 is blinked at the period f1.

(c) Alarm pattern 3:

A pattern, in which the buzzer 10 is turned off and on every one period f2 (for example, 30 seconds), is repeated cyclically as well as a pattern, in which the alarm lamp 9 is set to the lighting mode and the blinking mode at every one period f2, is repeated cyclically.

(d) Alarm pattern 4:

The buzzer 10 is turned off as well as the pattern, in which the alarm lamp 9 is set to the lighting mode and the blinking mode at every one period f2 (for example, 30 seconds), is repeated cyclically.

(e) Alarm pattern 5:

A pattern, in which the buzzer 10 is turned on and off every one period f2 (for example, 30 seconds), is repeated cyclically as well as a pattern, in which the alarm lamp 9 is set to the blinking mode and the lighting mode at every one period f2, is repeated.

It should be noted that, in the alarm pattern 5, the buzzer 10 is sounded and the alarm lamp 9 is lighted and blinked repeatedly at the same timing as that of the alarm pattern 3. However, when, for example, the alarm pattern 4 is shifted to the alarm pattern 5, using the alarm pattern 3 in place of the alarm pattern 5 causes a time lag of an elapsed time of t3 until the buzzer 10 is sounded.

Next, an alarm control processing executed by the alarm control circuit 1 will be explained with reference to flowcharts shown in FIGS. 2–5. Note that, although it is supposed that the driver who represents the occupant fastens the seat belt in the following explanation, it is needless to say that this embodiment can be also applied to the occupants who sit on a passenger seat and a rear seat.

When the ignition switch 4 is turned on, a system is initialized after it is reset, and a flag and the like are set to initial values. Thereafter, an alarm warning control routine shown in FIG. 2 will be executed.

The routine is started at every predetermined period, and, first, a first alarm mode is executed at step S1. The first alarm mode is processed according to the first alarm mode subroutine shown in FIG. 3.

In the subroutine, first, a time T1 elapsed after the ignition switch 4 is turned on is measured at step S11, and it is examined whether or not the elapsed time T1 has reached a set time T0 (for example, 6 seconds). For example, since $T1 \leq T0$ just after the ignition switch 4 is turned on, a process goes to step S12. Further, when the time T1 elapsed after the ignition switch 4 is turned on exceeds the set time T0 (T1>T0), the process leaves the routine and goes an alarm control routine at step S2 shown in FIG. 2.

When the process goes to step S12, it is examined whether or not the seat belt switch 5 is turned on, and when the seat belt switch 5 is turned on and the seat belt is unfastened, the process goes to step S13, whereas when the seat belt switch 5 is turned off and the seat belt is fastened, the process goes to step S14.

When, for example, the driver turns on the ignition switch 4 without fastening the seat belt, processing at step S13 is executed first. In this case, when the seat belt is fastened before the elapsed time T1 reaches the set time T0, the process goes to step S14. On the other hand, when the driver turns on the ignition switch 4 while fastening the seat belt, the processing at step S14 is executed first.

Figure 7A:
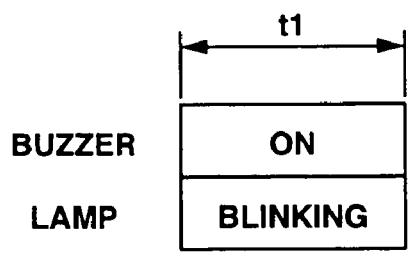
FIGS. 7A–7E are views explaining alarm patterns.
Figure 7B:
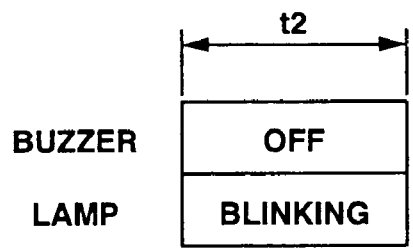
Figure 7C:
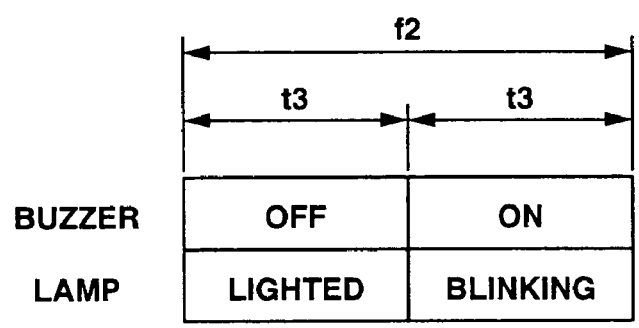

At step S13, a signal for driving the alarm pattern 1 is output to the alarm display drive circuit 7 and the alarm sound drive circuit 8, and the process returns to step S11. As shown in FIG. 7A, in the alarm pattern 1, the damping sound is continuously output by the buzzer 10 during the set time t1 (for example, 6 seconds) as well as the alarm lamp 9 is blinked at the period (f1) corresponding to the damping sound output once (refer to FIG. 6). Since the driver intends to drive the vehicle just after the ignition switch 4 is turned on, the awareness of the driver for fastening the seat belt can be raised by simultaneously sounding the buzzer 10 and blinking the alarm lamp 9.

Further, at step S14, after the signal for driving the alarm pattern 2 (refer to FIG. 7B) is output to the alarm display drive circuit 7, the process returns to step S11.

In the first alarm mode, when the driver turns on the ignition switch 4 without fastening the seat belt, the buzzer 10 outputs the damping sound as well as the alarm lamp 9 is blinked according to the alarm pattern as shown in FIG. 7A. In this case, since the buzzer 10 sounds and the alarm lamp 9 blinks in synchronism with each other (refer to FIG. 6), the driver can easily recognizes a relation between an unbuckled state of the seat belt and the alarm. Further, a recognition thereof can be improved by blinking the alarm lamp 9.

Further, when the driver fastens the seat belt while the first alarm mode subroutine is executed, that is, while the time T1 elapsed after the ignition switch 4 is turned on is within the set time T0, since a delay time is set to the alarm lamp 9 so that the buzzer 10 and the alarm lamp 9 are not stopped at the same time, uncomfortable feeling is not given to the driver. Note that when the the driver turns on the ignition switch 4 while fastening the seat belt, the buzzer 10 and the alarm lamp 9 are not stopped simultaneously, and the alarm lamp 9 blinks during the set time T0.

Further, when the driver unfastens the seat belt while the first alarm mode subroutine is executed, the alarm pattern 1 is executed again, which can raise the awareness of the driver for fastening the seat belt.

Figure 2:
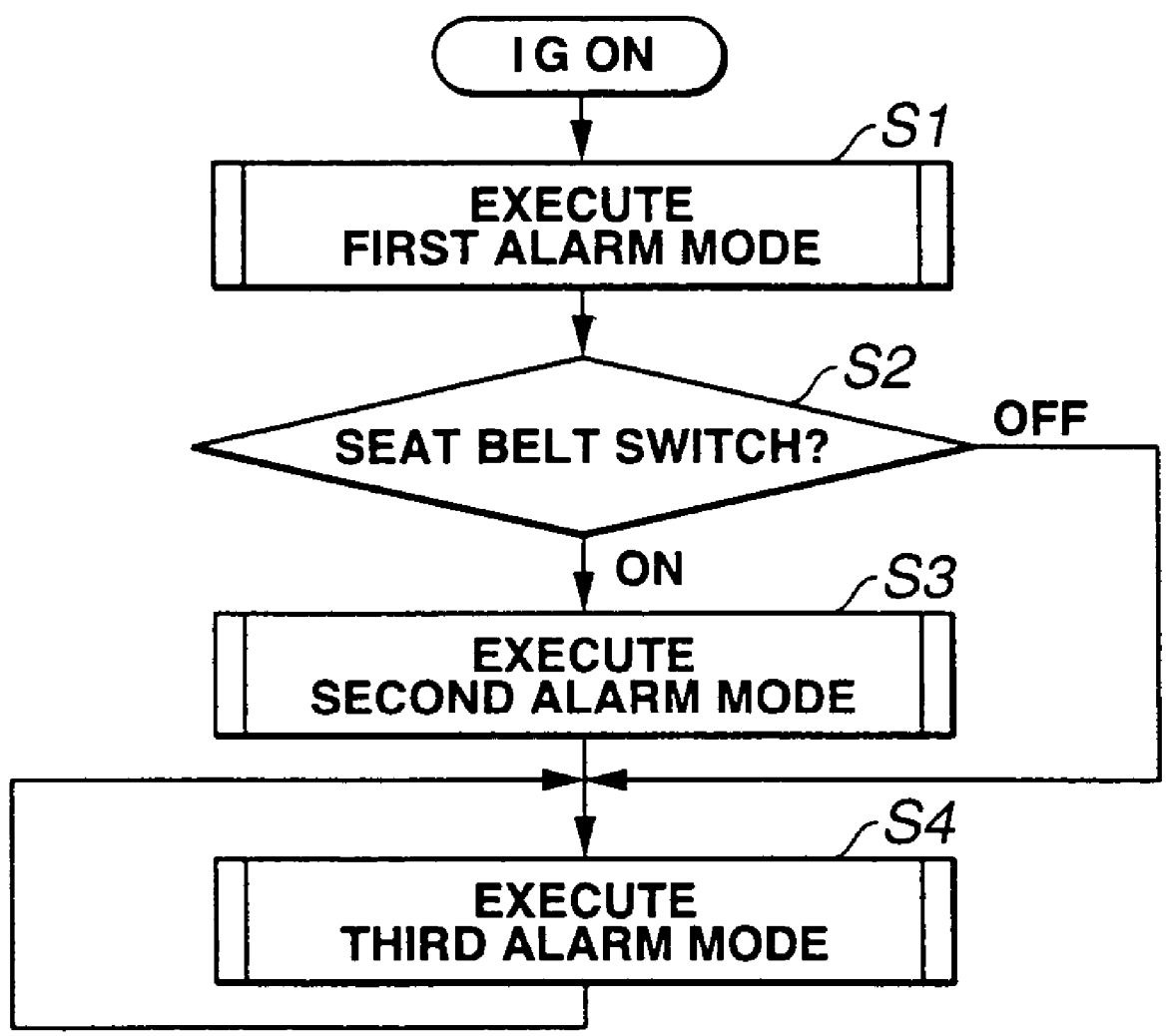
FIG. 2 is a flowchart showing an alarm control routine.
Figure 3:
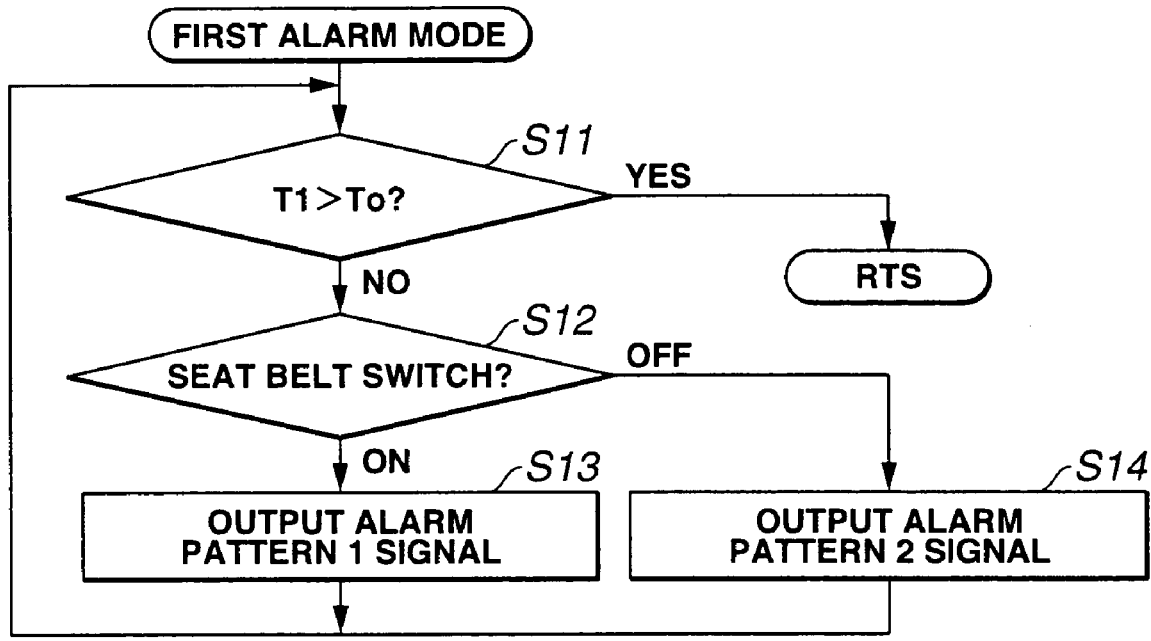
FIG. 3 is the flowchart showing a first alarm mode subroutine.
Figure 4:
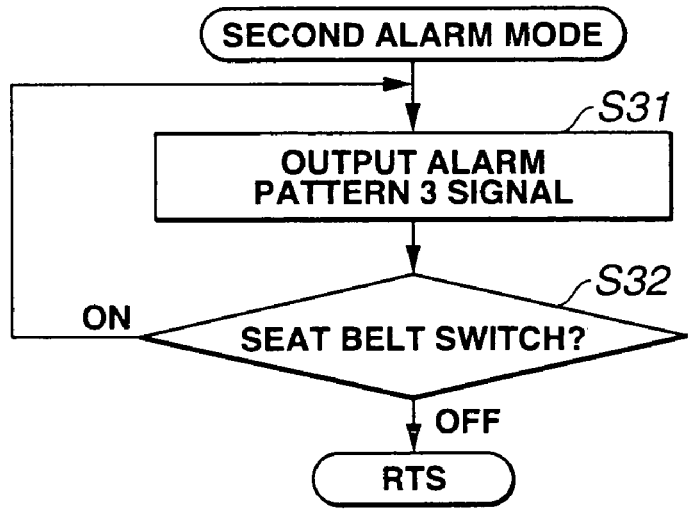
FIG. 4 is the flowchart showing a second alarm mode subroutine.

When the elapsed time T1 has reached the set time T0 and the process goes to step S2 of the alarm control routine shown in FIG. 2 from step S11, it is examined again whether or not the seat belt switch 5 is turned on. When the seat belt switch 5 is turned on and the seat belt is unfastened, the process goes to step S3, whereas, the process jumps to step S4 when the seat belt switch 5 is turned off and the seat belt is fastened.

When the process goes to step S3, the second alarm mode is executed. The second alarm mode is processed according to a second alarm mode subroutine shown in FIG. 4.

In this routine, first, the signal for driving the alarm pattern 3 (refer to FIG. 7C) is output to the alarm display drive circuit 7 and the alarm sound drive circuit 8 at step S31, and the process goes to step S32 and examines whether or not the seat belt switch 5 is turned on. When the seat belt switch 5 is turned on and the seat belt is unfastened, the process returns to step S31 and outputs the signal for executing the alarm pattern 3 repeatedly. Accordingly, the alarm pattern 3 is repeated until the driver fastens the seat belt.

Thereafter, when the driver fastens the seat belt and a turned-off signal is output from the seat belt switch 5, and the process escapes from the routine and goes to step S4 of the alarm control routine shown in FIG. 2.

In the second alarm mode, the buzzer 10 is turned on and off every predetermined period according to the alarm pattern 3 as well as the alarm lamp 9 lights when the buzzer 10 is turned off and blinks when the buzzer 10 is turned on in synchronism with the operation of the buzzer 10 until the driver fastens the seat belt.

When the second alarm mode is executed, it can be determined that the driver operates to drive on the premise of traveling because at least a time longer than the set time T0 has elapsed after the ignition switch 4 is turned on. Accordingly, the awareness of the driver for fastening the seat belt is raised by relentlessly (or persistently) warning him or her to fasten the seat belt by turning on and off the buzzer 10 and lighting and blinking the alarm lamp 9 in association with the buzzer 10 according to the alarm pattern 3.

When the turned-off signal is output from the seat belt switch 5 and the process goes to step S4 of the alarm control routine shown in FIG. 2, the third alarm mode is executed. The third alarm mode is repeated until the ignition switch 4 is turned off, that is, until an engine is stopped.

Figure 5:
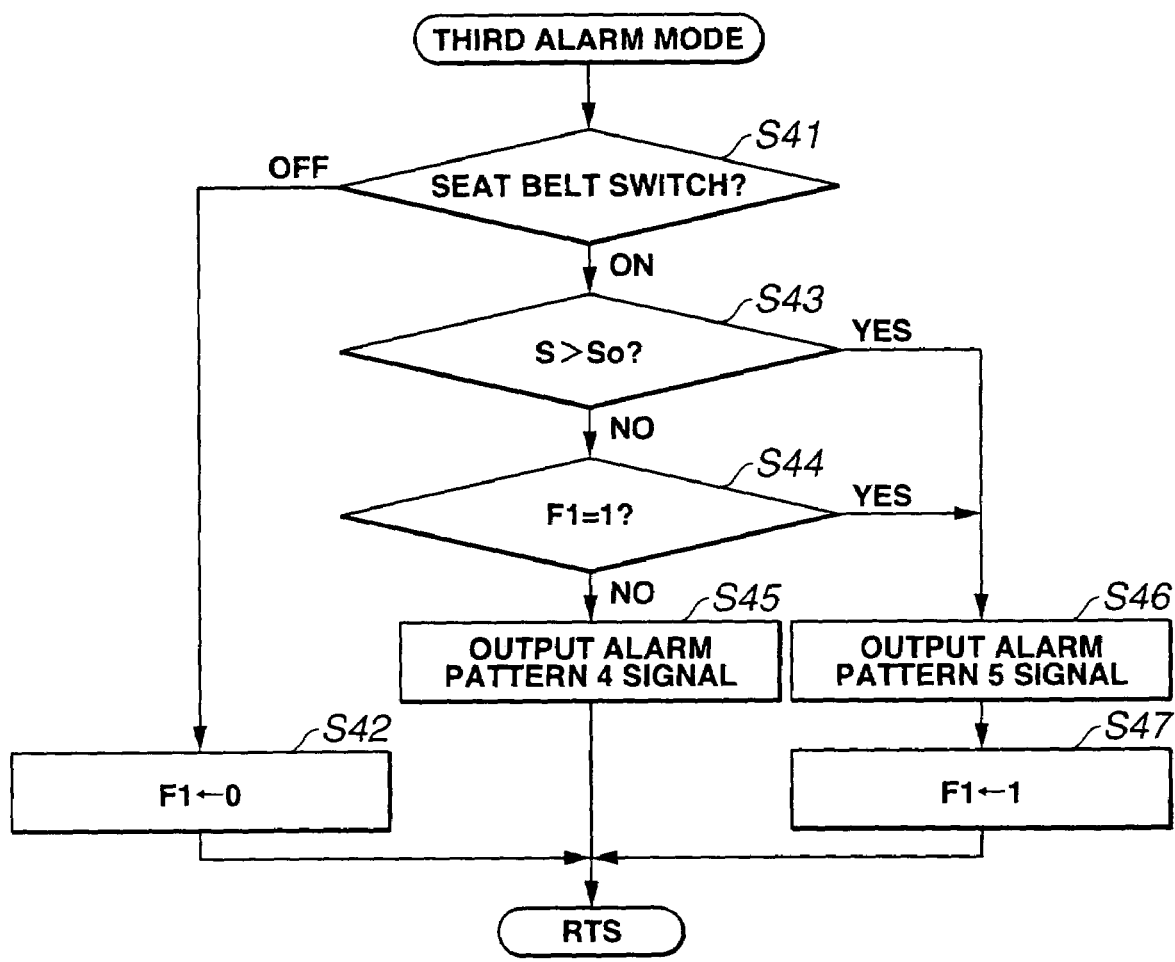
FIG. 5 is a flowchart showing a third alarm mode subroutine.

The third alarm mode is processed according to the third alarm mode subroutine shown in FIG. 5.

First, whether or not the seat belt switch 5 is turned on is examined again at step S41, and when the seat belt switch 5 is turned off and the seat belt is fastened, the process is branched to step S42, a first flag F1 is cleared (F1←0), and the process waits until a state, in which the seat belt switch 5 is turned on and the seat belt is unfastened, is detected.

On the other hand, when the seat belt switch 5 is turned on at step S41, that is, when the seat belt is unfastened after the warning mode is shifted to the third alarm mode, the process goes to step S43 and compares a vehicle speed S detected by the vehicle speed sensor 6 with a buzzer sound blowing speed So as a preset vehicle speed. In the embodiment, the buzzer sound blowing speed So is set to a value just before a vehicle speed at which an air bag can be actuated, and the vehicle speed is set to, for example, 15 [Km/h].

When S>So, the process goes to step S46 at which the signal for driving the strong alarm pattern 5 that is accompanied with the sound of the buzzer is output to the alarm display drive circuit 7 and the alarm sound drive circuit 8. Since the processing at step S46 is executed only when the vehicle speed S is equal to or larger than the buzzer sound blowing speed So as well as the seat belt is unfastened, the first flag F1 is set (F1←1) at step S47 to show that the warning mode is shifted to the third warning mode thereafter, and the process exits the routine.

Figure 7D:
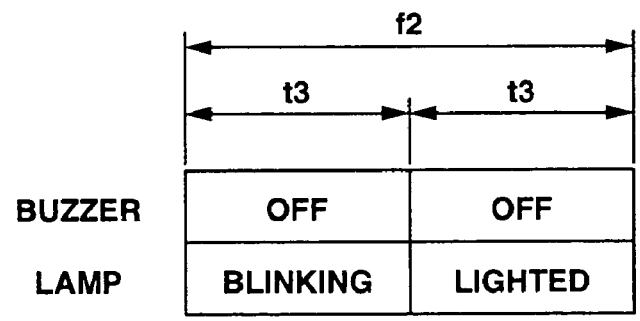
Figure 7E:
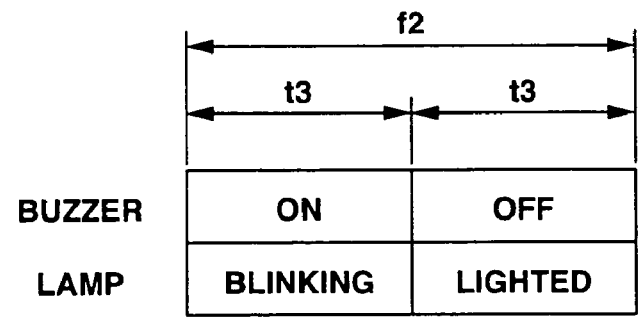

As shown in FIG. 7E, the alarm pattern 5 is the strong warning pattern in which a strong warning is given by outputting the damping sound by the buzzer 10 as well as blinking/lighting the alarm lamp 9 every period f2.

Further, when the vehicle is repeating to start from a stop state represented by S≦So and to stop, the process goes to step S44 and examines a value of the first flag F1.

When the first flag F1 is set (F1=1), the process goes to step S46 at which the strong alarm pattern 5 that is accompanied with the sound of the buzzer is continued, whereas when the first flag F1 is cleared (F1=0), the process goes to step 45 at which the signal for driving the weak alarm pattern 4 that is not accompanied with the sound of the buzzer is output to the alarm display drive circuit 7, and the process exits the routine.

As shown in FIG. 7D, since the alarm pattern 4 is the weak alarm pattern, a weak warning is given by lighting and blinking only the alarm lamp 9 repeatedly without operating the buzzer 10 according to the alarm pattern 4.

As described above, the third alarm mode is an alarm mode that assumes that after the driver fastens the seat belt once he or she unfastens it again, and when the vehicle speed S at the time the seat belt is unfastened is equal to or less than the buzzer sound blowing speed So, the weak warning is given by blinking and lighting only the alarm lamp 9 repeatedly without sounding the buzzer 10 according to the alarm pattern 4. Thereafter, when the vehicle speed S exceeds the buzzer sound blowing speed So, the alarm pattern 4 is shifted to the alarm pattern 5, in which the strong warning is given by blinking and lighting the alarm lamp 9 repeatedly as well as sounding the buzzer 10 in synchronism with the blinking of the alarm lamp 9, thereby the driver is caused to be more aware of fastening the seat belt.

Further, even if the vehicle speed S becomes less than the buzzer sound start vehicle speed So after the warning for fastening the seat belt has been given to the driver once according to the alarm pattern 5, the alarm pattern 5 is driven repeatedly (steps S44, S46) until the seat belt is fastened (until the seat belt switch 5 is turned off), and the alarm pattern 5 does not shift to the alarm pattern 4. Accordingly, the buzzer 10 is not sounded and stopped repeatedly even if the vehicle repeats stop and start because it waits at stoplights or it is caught in a traffic jam, and thus no uncomfortable feeling is given to the driver.

Further, when the driver unfastens the seat belt at the time the vehicle speed S is equal to or less than the buzzer sound blowing speed So, the weak warning is given according to the alarm pattern 4 in place of the alarm pattern 5 (steps S44, S45). Accordingly, even if the vehicle reaches a destination and the driver unfastens the seat belt while traveling at a very slow speed for parking and the like, the buzzer 10 is not sounded improperly, thereby no uncomfortable feeling is given to the driver.

It should be noted that the present invention is by no means limited to the above embodiment. For example, the second and third alarm modes may be cancelled by repeating fastening of the seat belt (the seat belt switch 5 is turned off) and unfastening of the seat belt (the seat belt switch 5 is turned on) a plurality of cycles while the first alarm mode is executed. Further, the cancel mode may be made effective only in one operation cycle from a time at which the ignition switch 4 is turned on to a time at which it is turned off.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

As described above, according to the present invention, there can be achieved excellent effects in that it can be properly notified that the seat belt is unfastened without giving incomprehensible feeling to the occupants including the driver and that the awareness for fastening the seat belt can be raised.

What is claimed is:

1. A seat belt alarm apparatus, comprising:
    seat belt detection means for detecting whether or not a seat belt is fastened;
    alarm means for prompting the fastening of said seat belt;
    alarm drive means for driving said alarm means; and
    alarm control means for outputting a drive signal to said alarm drive means,
    wherein said alarm control means has at least two types of alarm patterns having a different alarm mode respectively;
    said alarm control means outputs a drive signal having a weak alarm pattern after an ignition switch is turned on, when said seat belt detection means detects that said seat belt is unfastened and when a vehicle speed is equal to or less than a set vehicle speed;
    said alarm control means outputs said drive signal having a continuous strong alarm pattern when said seat belt detection means detects that said seat belt is unfastened and said vehicle speed is more than said set vehicle speed until said seat belt detection means detects that said seat belt is fastened; and
    said alarm control means continuously outputs said drive signal having said strong alarm pattern even if said vehicle speed becomes equal to or less than said set vehicle speed thereafter.

2. The seat belt alarm apparatus according to claim 1, wherein:
    said alarm control means outputs the drive signal having said weak alarm pattern when said seat belt detection means detects that said seat belt is fastened and then detects that said seat belt is unfastened and when said vehicle speed is equal to or less than said set vehicle speed.

3. The seat belt alarm apparatus according to claim 2, wherein:
    said alarm control means outputs said drive signal having said strong alarm pattern when said vehicle speed is more than said set vehicle speed after said drive signal having said weak alarm pattern is output, and
    said alarm control means continuously outputs said drive signal having said strong alarm pattern when said vehicle speed becomes equal to or less than said set vehicle speed thereafter.

4. The seat belt alarm apparatus according to claim 1, wherein:
    said alarm means has at least said two types of said alarm means for issuing a different alarm; and
    said respective alarm means are driven in synchronism with each other in said strong alarm pattern.

5. The seat belt alarm apparatus according to claim 2, wherein:
    said alarm means has at least said two types of said alarm means for issuing a different alarm; and
    said respective alarm means are driven in synchronism with each other in said strong alarm pattern.

6. The seat belt alarm apparatus according to claim 3, wherein:
    said alarm means has at least said two types of said alarm means for issuing said different alarm; and
    said respective alarm means are driven in synchronism with each other in said strong alarm pattern.

* * * * *